United States Patent
Neil, Jr. et al.

(10) Patent No.: US 10,569,960 B2
(45) Date of Patent: Feb. 25, 2020

(54) SYSTEM AND METHOD FOR TENSIONING A CONVEYOR IN A MINING SYSTEM

(71) Applicant: Joy Global Underground Mining LLC, Warrendale, PA (US)

(72) Inventors: Paul A. Neil, Jr., Bristol, TN (US); Keith L. Gregory, Bristol, VA (US); Bryan K. Ashley, Bristol, VA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 16/039,992

(22) Filed: Jul. 19, 2018

(65) Prior Publication Data
US 2020/0024075 A1 Jan. 23, 2020

(51) Int. Cl.
 B65G 21/14 (2006.01)
 B65G 23/44 (2006.01)
 B65G 23/00 (2006.01)
 B65G 39/16 (2006.01)
 B65B 13/22 (2006.01)

(52) U.S. Cl.
 CPC .............. *B65G 23/44* (2013.01); *B65G 21/14* (2013.01); *B65B 13/22* (2013.01); *B65G 39/16* (2013.01)

(58) Field of Classification Search
None
See application file for complete search history.

(56) References Cited

U.S. PATENT DOCUMENTS

| 2,612,988 | A | 10/1952 | Andrews |
| 3,382,729 | A | 5/1968 | Steinke |
| 3,777,879 | A | 12/1973 | Dehne |
| 4,284,192 | A | 8/1981 | Taylor |
| 4,657,131 | A | 4/1987 | Brychta et al. |
| 4,995,506 | A | 2/1991 | Langenbacher et al. |
| 5,030,173 | A | 7/1991 | Bryant |
| 5,131,528 | A | 7/1992 | Bandy, Jr. |
| 5,632,372 | A | 5/1997 | Steinbuchel, IV et al. |
| 5,647,640 | A | 7/1997 | Heintzmann et al. |
| 5,895,332 | A | 4/1999 | Olson et al. |
| 6,695,130 | B1 | 2/2004 | Blaylock et al. |

(Continued)

FOREIGN PATENT DOCUMENTS

| CN | 109573480 A | 4/2019 |
| GB | 1083192 A | 9/1967 |

(Continued)

OTHER PUBLICATIONS

United Kingdom Intellectual Property Office Search Report for Application No. GB109621.3 dated Dec. 3, 2019 (5 pages).

*Primary Examiner* — Kavel Singh
(74) *Attorney, Agent, or Firm* — Michael Best & Friedrich LLP

(57) ABSTRACT

A tensioning system for a conveyor element of a conveyor is provided. The tensioning system includes an obstruction. A base is movable relative to the obstruction. The tensioning system further includes a plurality of spacers. At least one spacer of the plurality of spacers is movable from a resting position to an engagement position by only the influence of gravity. The at least one spacer rests on the obstruction in the resting position. The at least one spacer is disposed between the base and the obstruction in the engagement position.

19 Claims, 13 Drawing Sheets

(56) References Cited

U.S. PATENT DOCUMENTS

| | | |
|---|---|---|
| 7,322,462 B2 | 1/2008 | Landry |
| 7,520,378 B2 | 4/2009 | Hansen et al. |
| 7,861,843 B2 | 1/2011 | Aulanko et al. |
| 9,415,940 B2 * | 8/2016 | Slavov .................. B65G 23/44 |
| 9,932,177 B2 | 4/2018 | Watson et al. |
| 2006/0151301 A1 | 7/2006 | Landry |
| 2010/0270131 A1 | 10/2010 | Vasey |
| 2011/0024268 A1 | 2/2011 | Merten et al. |
| 2013/0015043 A1 | 1/2013 | Tout et al. |
| 2015/0321856 A1 | 11/2015 | De Goede et al. |

FOREIGN PATENT DOCUMENTS

| | | |
|---|---|---|
| GB | 2042453 A | 9/1980 |
| GB | 2493269 A | 1/2013 |
| RU | 2054372 C1 | 2/1996 |

* cited by examiner

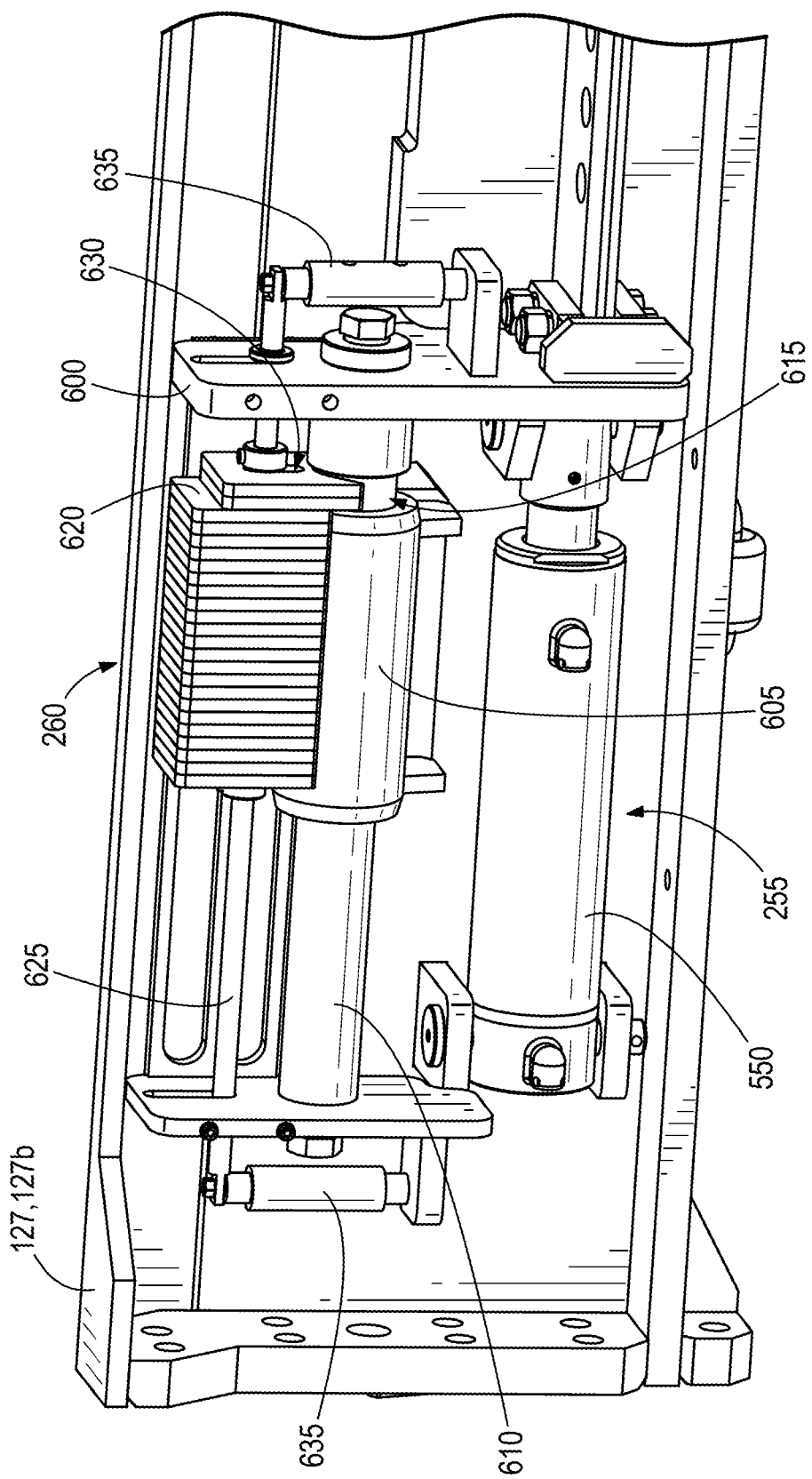

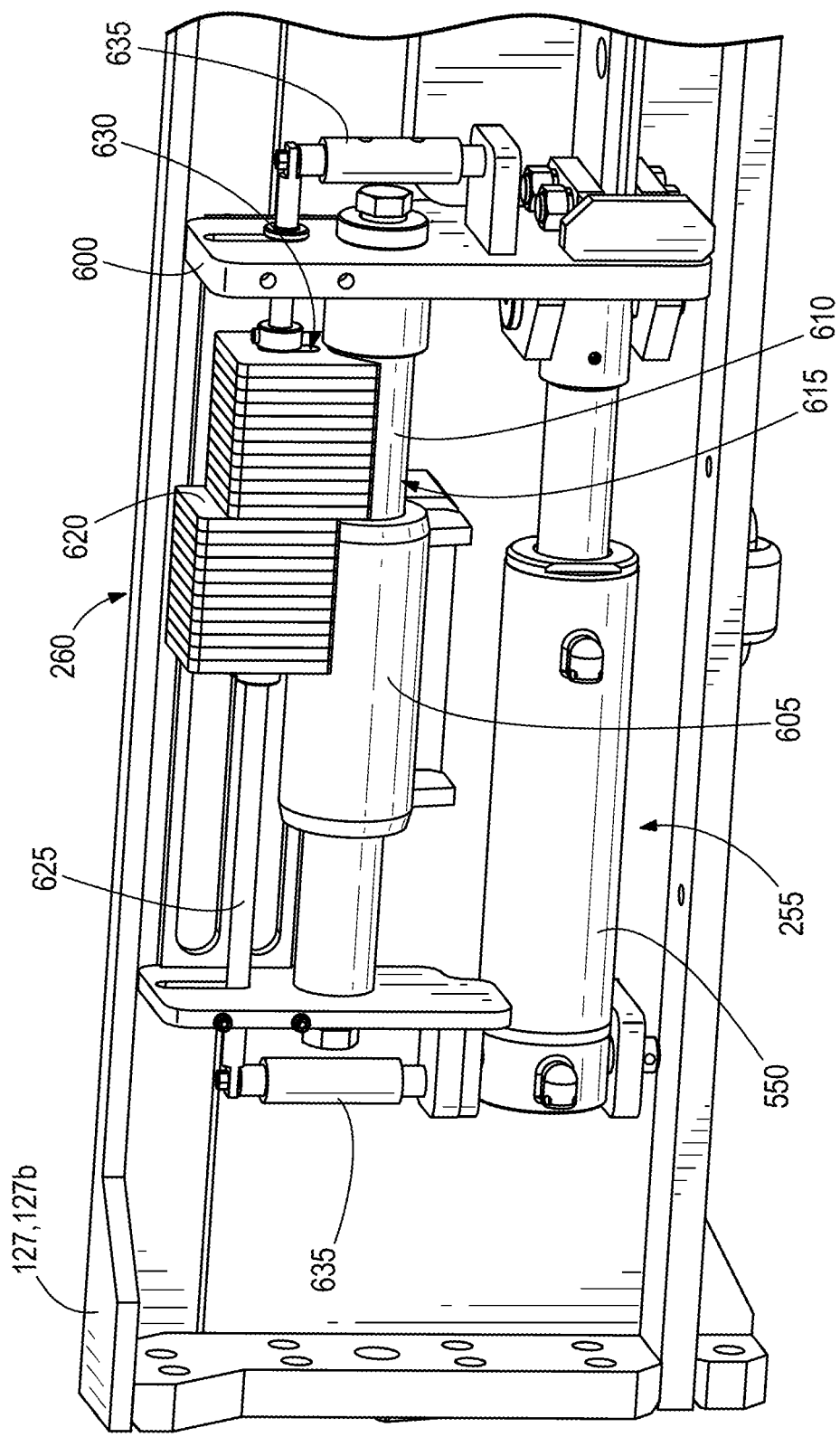

SYSTEM AND METHOD FOR TENSIONING A CONVEYOR IN A MINING SYSTEM

BACKGROUND

The present disclosure relates to methods and systems used for tensioning a conveyor.

SUMMARY

In one embodiment, the disclosure provides a tensioning system for a conveyor element of a conveyor. The tensioning system includes an obstruction. A base is movable relative to the obstruction such that the base and the obstruction change from a first configuration to a second configuration. The base is farther from the obstruction in the second configuration than it is in the first configuration. A shim receiving area is defined between the obstruction and the base. A rail is spaced apart from the obstruction. A plurality of shims is disposed on the rail. Each shim of the plurality of shims is movable relative to the rail. Each shim of the plurality of shims is also movable into the shim receiving area. In the first configuration, the obstruction prevents a respective shim from entering the shim receiving area. In the second configuration, the obstruction no longer prevents the respective shim from entering the shim receiving area.

In another embodiment, the disclosure provides a tensioning system for a conveyor element of a conveyor. The tensioning system includes an obstruction. A base is movable relative to the obstruction. The tensioning system further includes a plurality of spacers. At least one spacer of the plurality of spacers is movable from a resting position to an engagement position by only the influence of gravity. The at least one spacer rests on the obstruction in the resting position. The at least one spacer is disposed between the base and the obstruction in the engagement position.

In yet another embodiment, the disclosure provides a method of tensioning a conveyor element of a conveyor. The method includes increasing the tension in the conveyor element, dropping a first spacer into a spacer receiving area, increasing the tension in the conveyor element further, and dropping a second spacer into the spacer receiving area.

Other aspects of the disclosure will become apparent by consideration of the detailed description and accompanying drawings.

BRIEF DESCRIPTION OF THE DRAWINGS

FIG. 8B illustrates a detailed perspective view of the subsystems of FIG. 7 in a second intermediate position.

FIG. 8C illustrates a detailed perspective view of the subsystems of FIG. 7 in a third intermediate position.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways. Also, it is to be understood that the phraseology and terminology used herein are for the purpose of description and should not be regarded as limiting. The use of "including," "comprising," "having," and variations thereof herein are meant to encompass the items listed thereafter and equivalents thereof, as well as additional items. Unless specified or limited otherwise, the terms "mounted," "connected," "supported," "coupled," and variations thereof are used broadly and encompass both direct and indirect relationships.

Figure 1:
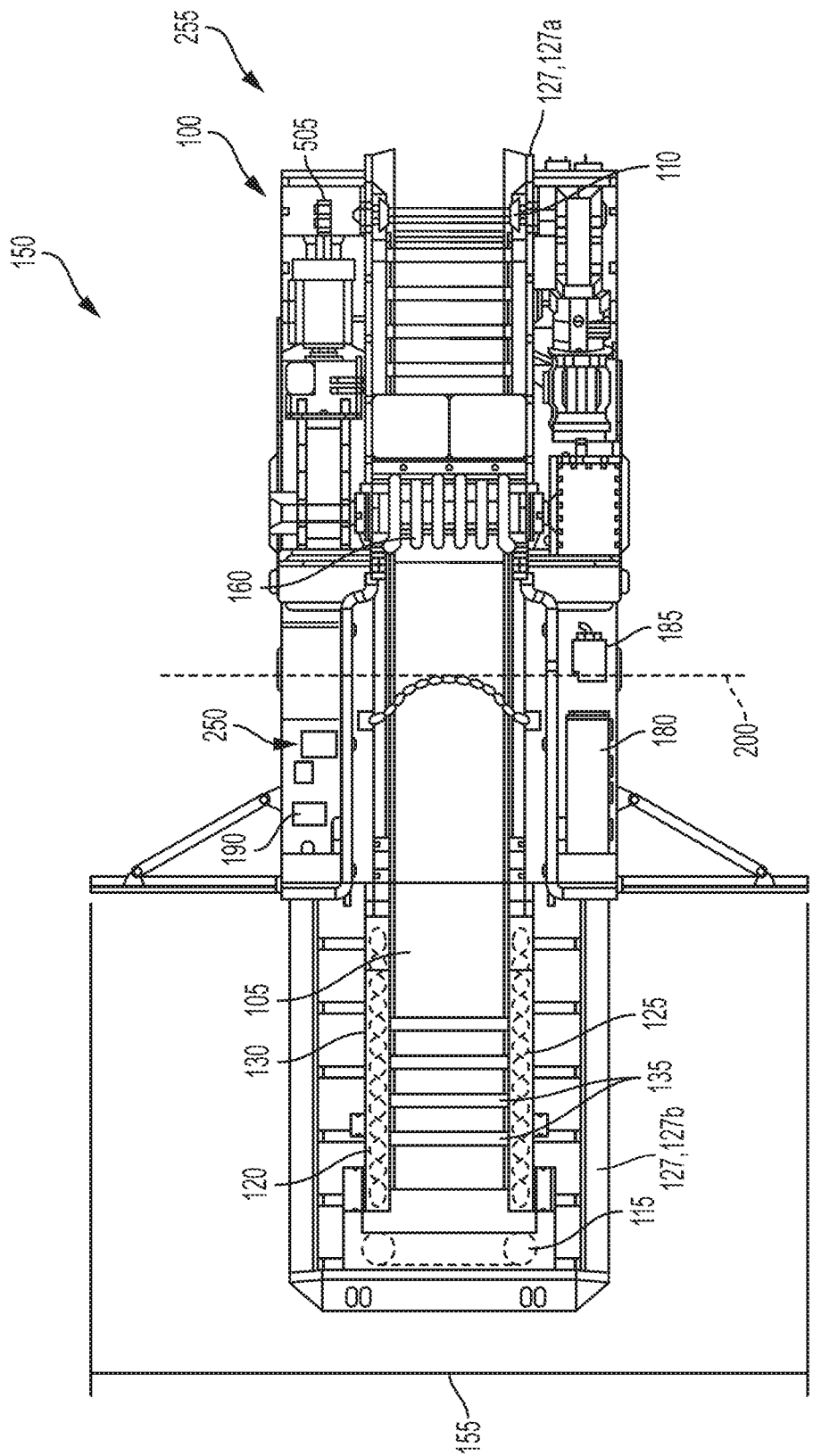
FIG. 1 illustrates a top view of a crusher of a mining system according to one embodiment of the disclosure.

FIG. 1 illustrates a conveyor system 100 used for transporting mining material. As shown in FIG. 1, the conveyor system 100 includes a conveyor 105, two drive shafts (i.e., a head shaft 110 and a tail shaft 115 (shown in phantom)), a first chain 120 (shown in phantom), and a second chain 125 (shown in phantom). As shown in FIG. 1, the head shaft 110 and the tail shaft 115 are supported by a frame 127 and are positioned on opposite ends of the conveyor 105. The head shaft 110 is connected to a first frame section 127a and the tail shaft 115 is connected to a second frame section 127b. The tail shaft 115 is located at an intake end of the crusher 150 and acts as an idler. The first chain 120 and the second chain 125 (e.g., the conveyor elements) are positioned around the head shaft 110 and the tail shaft 115 to form the conveyor 105. As shown in FIG. 1, the first chain 120 is positioned around the first end of the head shaft 110 and around the first end of the tail shaft 115 (e.g., a right end of the head shaft and the tail shaft). The second chain 125 is positioned around the second end of the head shaft 110 and around the second end of the tail shaft 115 (e.g., a left end of the head shaft and the tail shaft). The chains 120, 125 are driven by one or more drive mechanisms (e.g., motors), and the movement of the chains around the head shaft 110 and the tail shaft 115 cause the conveyor 105 to transport the mining material. In some embodiments, the first chain 120 is different (e.g., a different type or different size) from the second chain 125. In the illustrated embodiment, the conveyor 105 also includes chain covers 130 and conveyor flights 135 linking the conveyor chains 120, 125.

Figure 2:
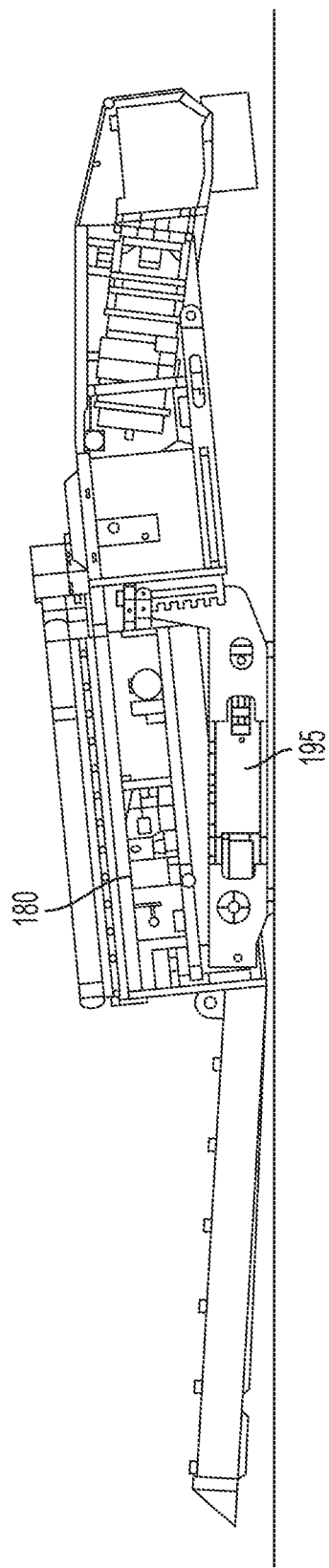
FIG. 2 illustrates a side view of the crusher of FIG. 1.

In the illustrated embodiment, the conveyor system 100 is part of a mobile crusher 150, which in turn, may be part of a stageloader. The crusher 150 includes a hopper 155 for providing mining material to the conveyor 105. The conveyor 105 transports the mining material to a crushing mechanism 160 where at least some of the mining material is crushed to achieve a target size. As shown in FIGS. 1 and 2, the crusher 150 also includes a starter box 180, control valves 185, and other control components 190 for operating the crusher. Turning to FIG. 2, the crusher 150 is mounted on two crawlers 195 (only one of which is shown in FIG. 2) for mobility. In other embodiments, the crawlers 195 could be replaced with wheels suitable for providing mobility in a mining environment. Further, the conveyor system 100 can be part of a different mining machine such as, for example, an armored face conveyor.

Returning to FIG. 1, for the conveyor system 100 to efficiently transport mining material from a first location to a second location, the chains 120, 125 of the conveyor 105 are properly tensioned. Proper conveyor tension is achieved by adjusting the position of the tail shaft 115 with respect to the head shaft 110. When the tail shaft 115 and/or the head shaft 110 are positioned farther apart from each other (e.g., farther from a conveyor centerline 200 in FIG. 1), the conveyor 105 is under higher tension (i.e., more tensioned). When the tail shaft 115 and the head shaft 110 are positioned closer to each other (e.g., closer to the conveyor centerline 200), the conveyor 105 is under less tension (i.e., less tensioned).

Figure 3:
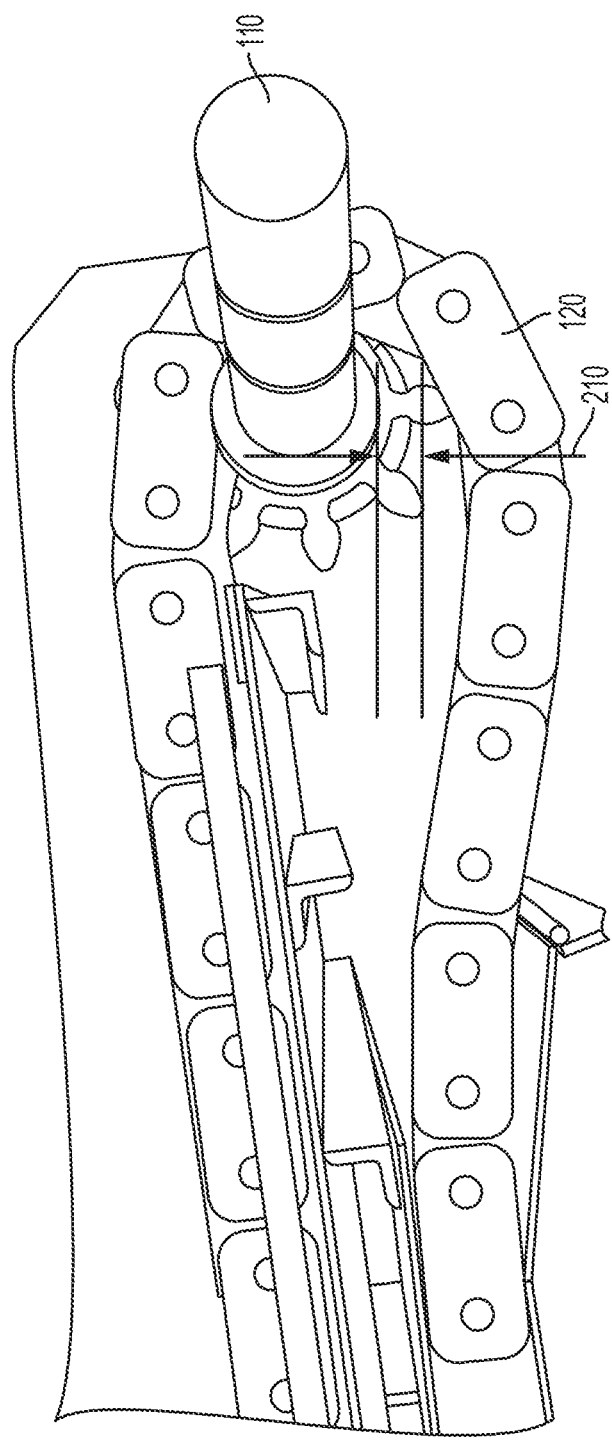
FIG. 3 illustrates an improperly tensioned conveyor of the mining system of FIG. 1.

FIG. 3 illustrates an example of an improperly tensioned chain 120. The conveyor chains 120, 125 are properly tensioned when a slack distance 210 between the head shaft 110 and the conveyor chains is within a predetermined distance range. The slack distance 210 is visible from behind the head shaft 110 and corresponds to a distance between the lowest portion of the conveyor chains 120, 125 in a discharge area of the conveyor 105 (e.g., the area occupied by the chains after the chain wraps around the head shaft). In the illustrated embodiment, the predetermined distance range for the slack distance 210 is between approximately 15 millimeters (mm) and approximately 50 mm. A slack distance 210 of less than, for example, 15 mm indicates the conveyor 105 is over-tensioned, and a slack distance of more than 50 mm indicates the conveyor is under-tensioned. In other embodiments, however, the predetermined distance range may be different based on, for example, the length of the conveyor 105 and/or the weight of the material transported by the conveyor. FIG. 3 illustrates a slack distance 210 between the head shaft 110 and the first chain 120 that exceeds the predetermined distance range. In the example of FIG. 3, the slack distance 210 is approximately 55 mm. When the chains 120, 125 are under-tensioned, the slack distance 210 may also be referred to as "droop" of the chain.

Returning to FIG. 1, the conveyor system 100 includes a conveyor tensioning system to automatically shift the head shaft 110 and/or the tail shaft 115 away from each other to properly tension the conveyor 105. The conveyor tensioning system includes an electronic subsystem 250, a hydraulic subsystem 255, and a mechanical subsystem 260 (shown in FIGS. 4-10 and described in greater detail below). The electronic subsystem 250 may receive signals from actuators and sensors and send activation signals to the hydraulic subsystem 255 based on the received signals. The hydraulic subsystem 255 is activated by the electronic subsystem 250 and drives the mechanical subsystem 260. The hydraulic subsystem 255 moves (e.g., pushes) one of the drive shafts 110, 115 of the conveyor 105 toward or away from the centerline 200 of the conveyor to tension the conveyor until the conveyor is properly tensioned. The mechanical subsystem 260 prevents the first frame section 127*a* and second frame section 127*b* from moving to the contracted position abruptly in the event of a failure of the hydraulic subsystem 255.

FIGS. 4-10 illustrate only the first side of a hydraulic cylinder portion of the hydraulic subsystem 255, that is, only a first hydraulic cylinder 550. In other words, while the conveyor system 100 includes both the first hydraulic cylinder 550 and a second hydraulic cylinder, only the first hydraulic cylinder is illustrated and described in detail. It is to be understood, however, that the second side of the hydraulic cylinder portion of the hydraulic subsystem 255 mirrors the first side of the hydraulic cylinder portion of the hydraulic subsystem as described herein.

The hydraulic subsystem 255, in some embodiments, includes a hydraulic pump 505, a first hydraulic cylinder 550, and the second hydraulic cylinder (not shown). When driven by the hydraulic pump 505, the first hydraulic cylinder 550 and second hydraulic cylinder extend (e.g., telescope outward). The first hydraulic cylinder 550 and second hydraulic cylinder are coupled to the mechanical subsystem and move the tail shaft 115 away from the centerline 200 of the conveyor 105. In other embodiments, the first hydraulic cylinder 550 and second hydraulic cylinder are configured to move the head shaft 110 instead of the tail shaft 115. In yet other embodiments, four hydraulic cylinders are used to move both sides of the tail shaft 115 and both sides of the head shaft 110.

FIGS. 4-10 illustrate the mechanical subsystem 260. FIGS. 6-10, however, illustrate only the first side of the mechanical subsystem 260. In other words, while the conveyor system 100 includes the mechanical subsystem 260 on both sides of the conveyor system 100, only the mechanical subsystem on one side of the conveyor system is illustrated in FIGS. 6-10 and described in detail. It is to be understood, however, that the second side of the mechanical subsystem 260 mirrors the first side of the mechanical subsystem as described herein.

Figure 4:
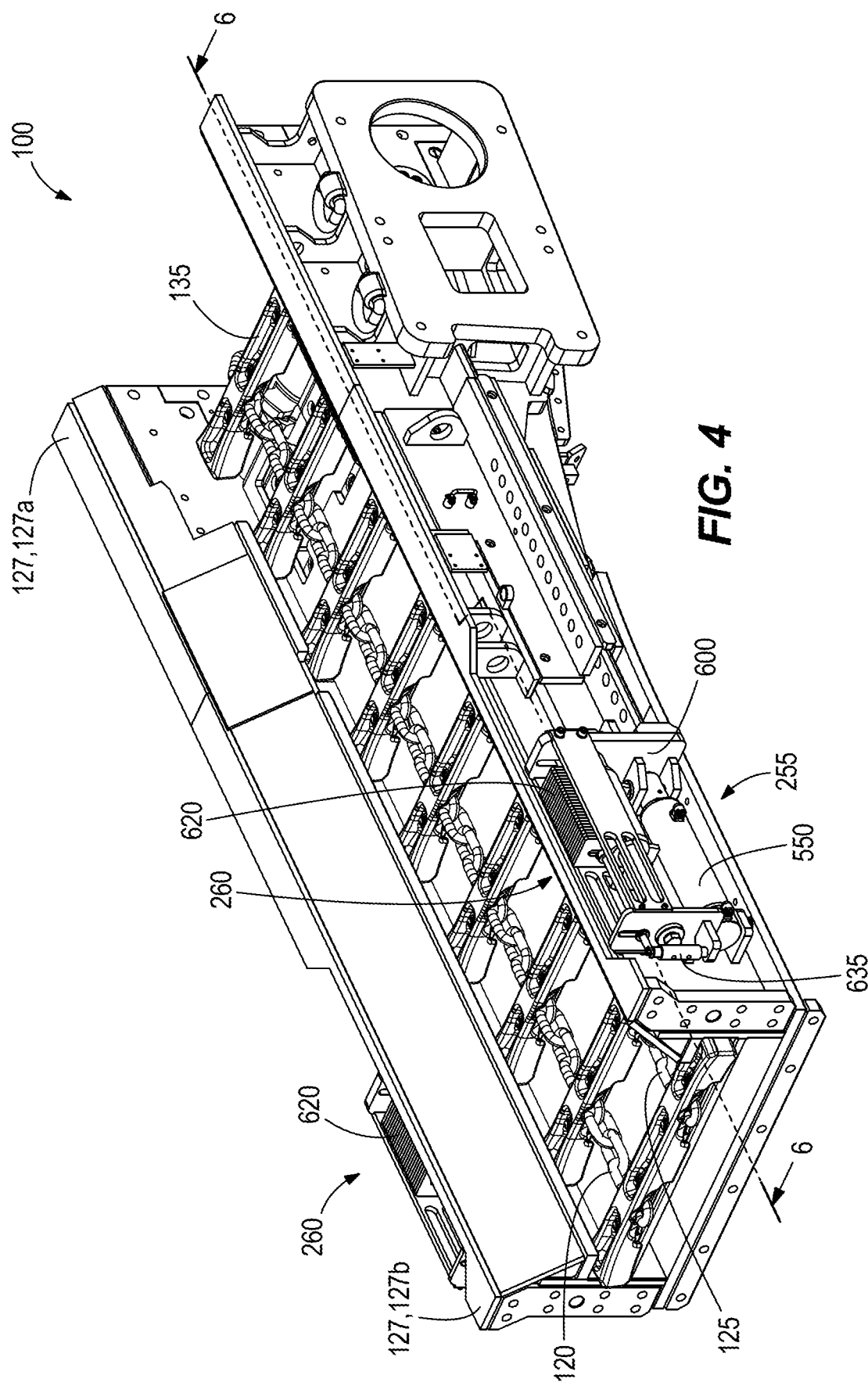
FIG. 4 illustrates a perspective view of a conveyor tensioning system of the mining system of FIG. 1.
Figure 5:
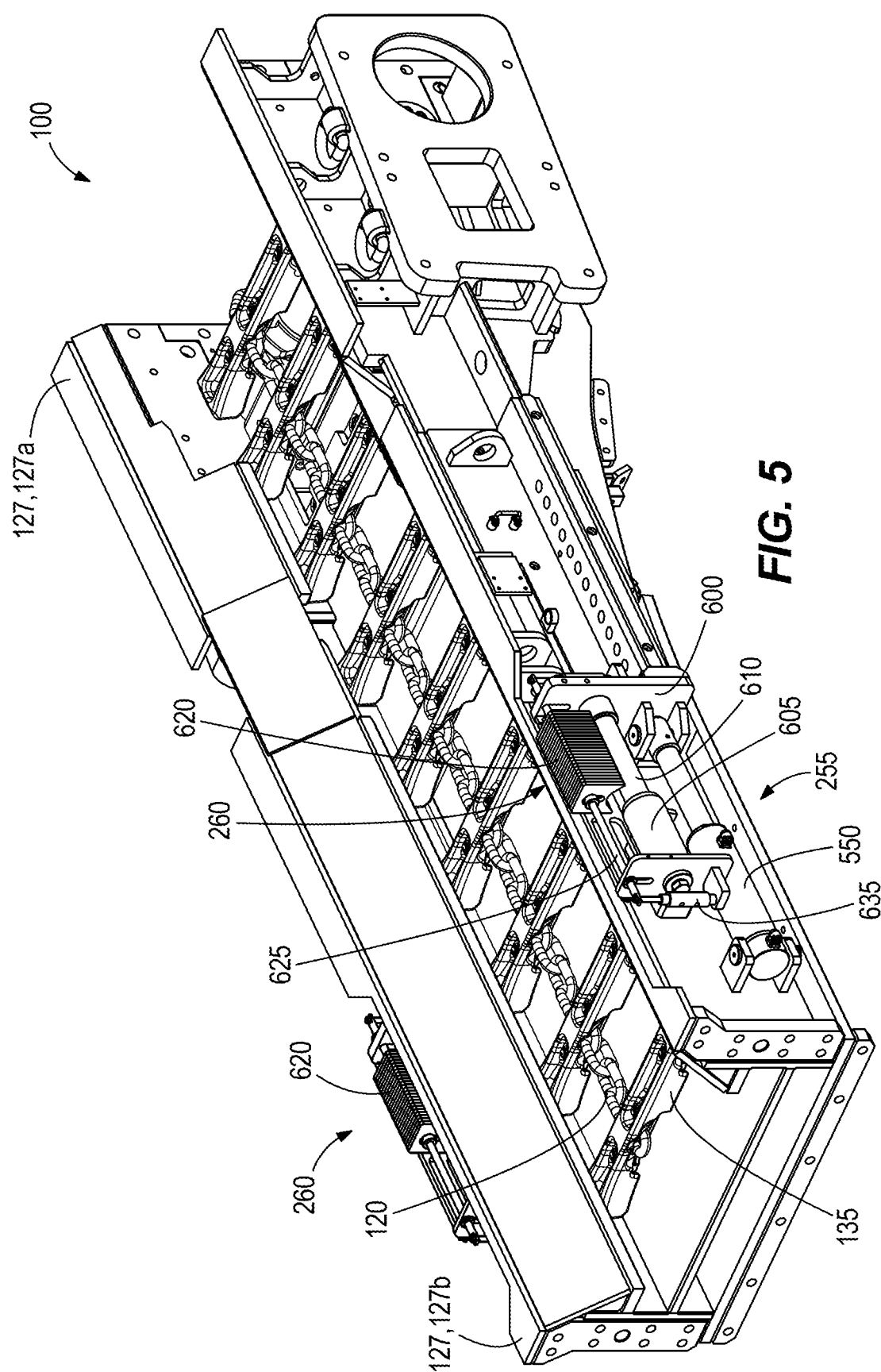
FIG. 5 illustrates a perspective view of the conveyor tensioning system of FIG. 4 in a completely extended position.
Figure 6:
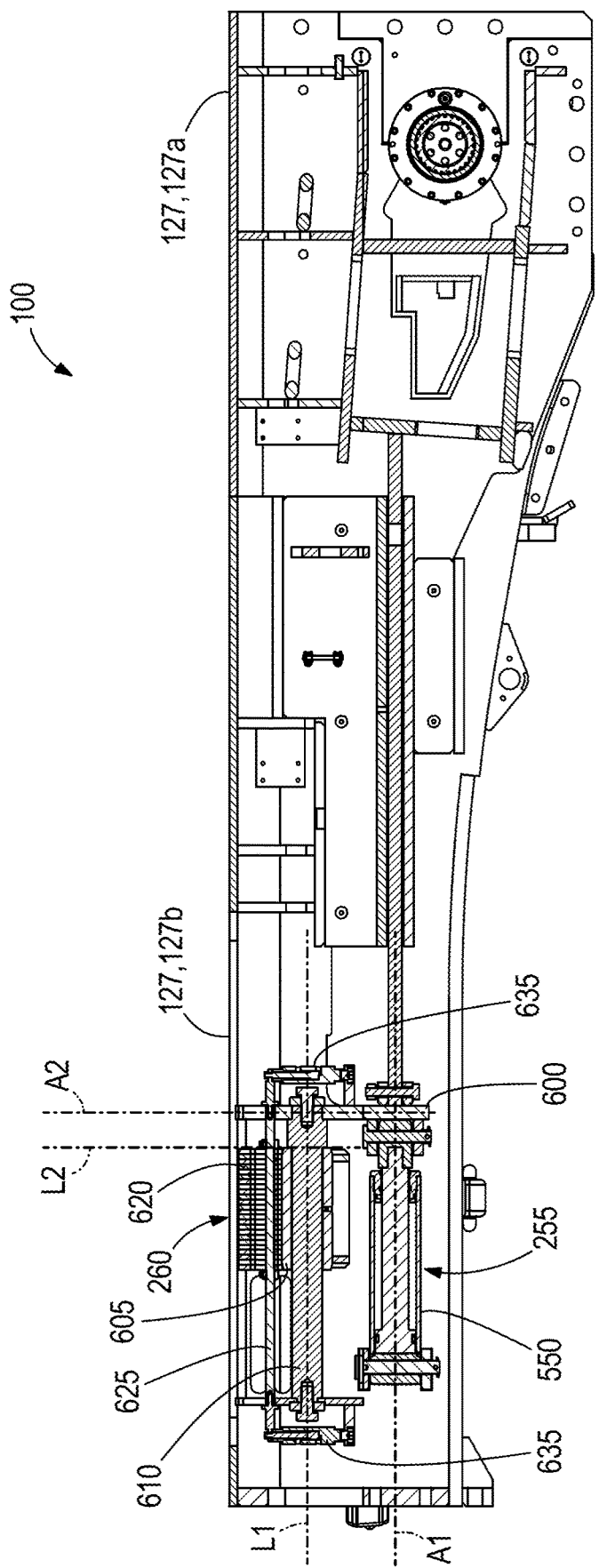
FIG. 6 illustrates a cross-sectional side view of the conveyor tensioning system of FIG. 4 in a completely contracted position.
Figure 7:
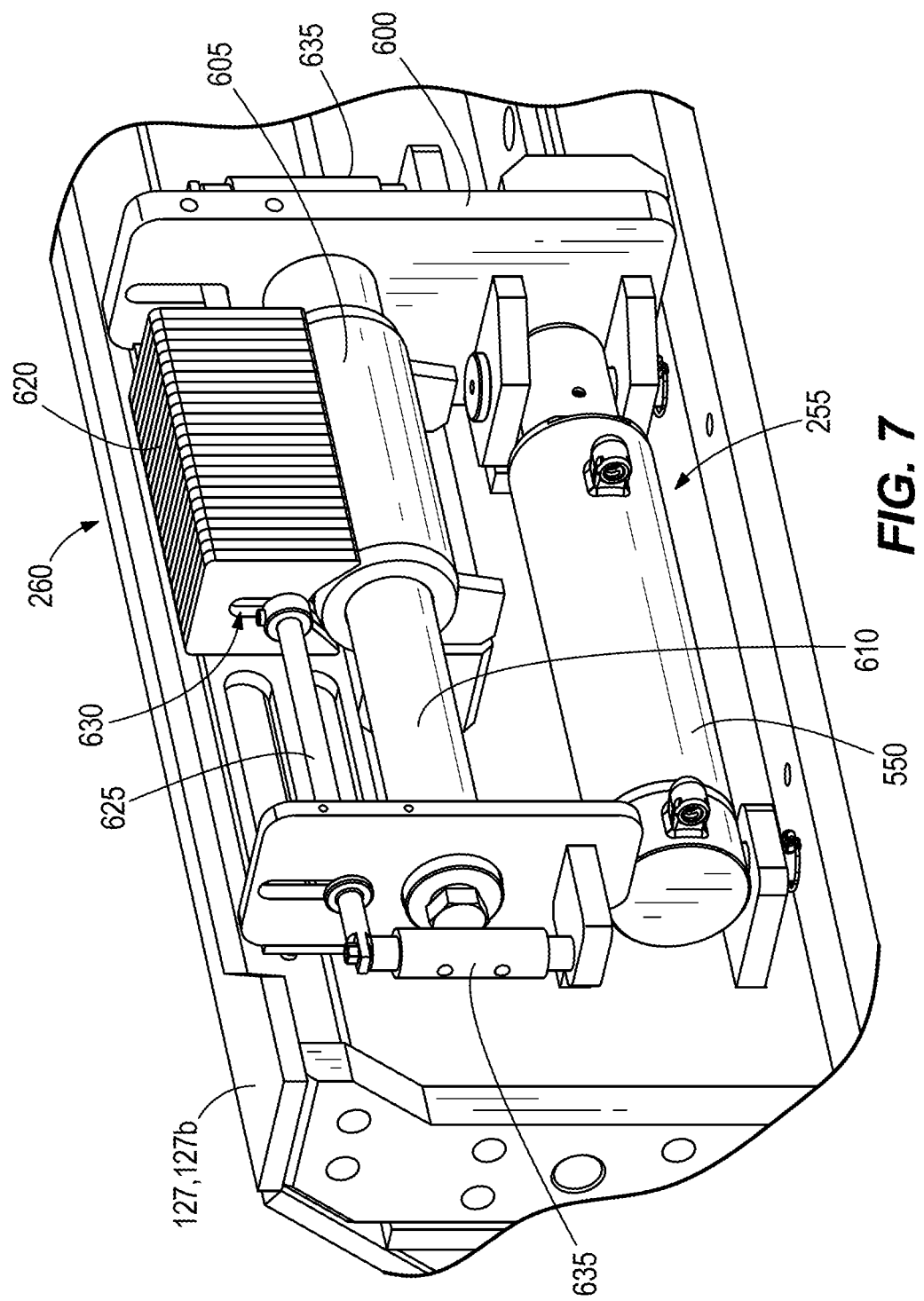
FIG. 7 illustrates a detailed perspective view of both a portion of a hydraulic subsystem and a mechanical subsystem of the conveyor tensioning system of FIG. 4 in the completely contracted position.

As shown in FIGS. 4, 6, and 7, the conveyor system 100 is in the completely contracted position. The conveyor system 100 is in the completely extended position in FIGS. 5 and 9. The first hydraulic cylinder 550 and second hydraulic cylinder are configured to move the conveyor system 100 from the completely contracted position to the completely extended position, as well as from the completely extended position to the completely contracted position. The frame sections 127*a*, 127*b* are farther apart from each other with the conveyor system 100 in the completely extended position than in the completely contracted position.

In at least one embodiment of the conveyor system 100, a base 600 of the mechanical subsystem 260 is connected to the first frame section 127*a*. The base 600 is configured to move with the first frame section 127*a* relative to the second frame section 127*b*. An obstruction 605 is connected to the second frame section 127*b*. In some embodiments, the obstruction 605 is configured to move with the second frame section 127*b*. Regardless of arrangement, the base 600 is movable relative to the obstruction 605 such that the base 600 and the obstruction 605 are positionable between a first configuration (e.g., the completely contracted position) and a second configuration (e.g., the completely extended position). The base 600 is farther from the obstruction 605 with the base 600 and the obstruction 605 in the second configuration compared to the first configuration. As shown in FIG. 6, the base 600 may be movable relative to the obstruction 605 along a line L1 that is parallel to a first axis A1. Alternatively, the base 600 may be movable relative to the obstruction 605 along a curved line or any other appropriate path that may or may not be parallel to the first axis A1. In the illustrated embodiment, the first axis A1 is a longitudinal axis of the adjacent hydraulic cylinder (in this case, the first hydraulic cylinder 550.

In some embodiments, the base 600 and the obstruction 605 are slidably connected to each other. In one particular embodiment, the base 600 is connected to a post 610, and the post is movable relative to the obstruction 605. The post 610 may also be slidably received in the obstruction 605. Regardless of whether a post 610 is present, a receiving area 615 is defined between the obstruction 605 and the base 600. This receiving area 615, or shim receiving area, may vary in size (e.g., length) depending on the configuration of the base 600 and the obstruction 605. In some embodiments, the receiving area 615 is largest with the base 600 and the obstruction 605 in the completely extended position.

Figure 8A:
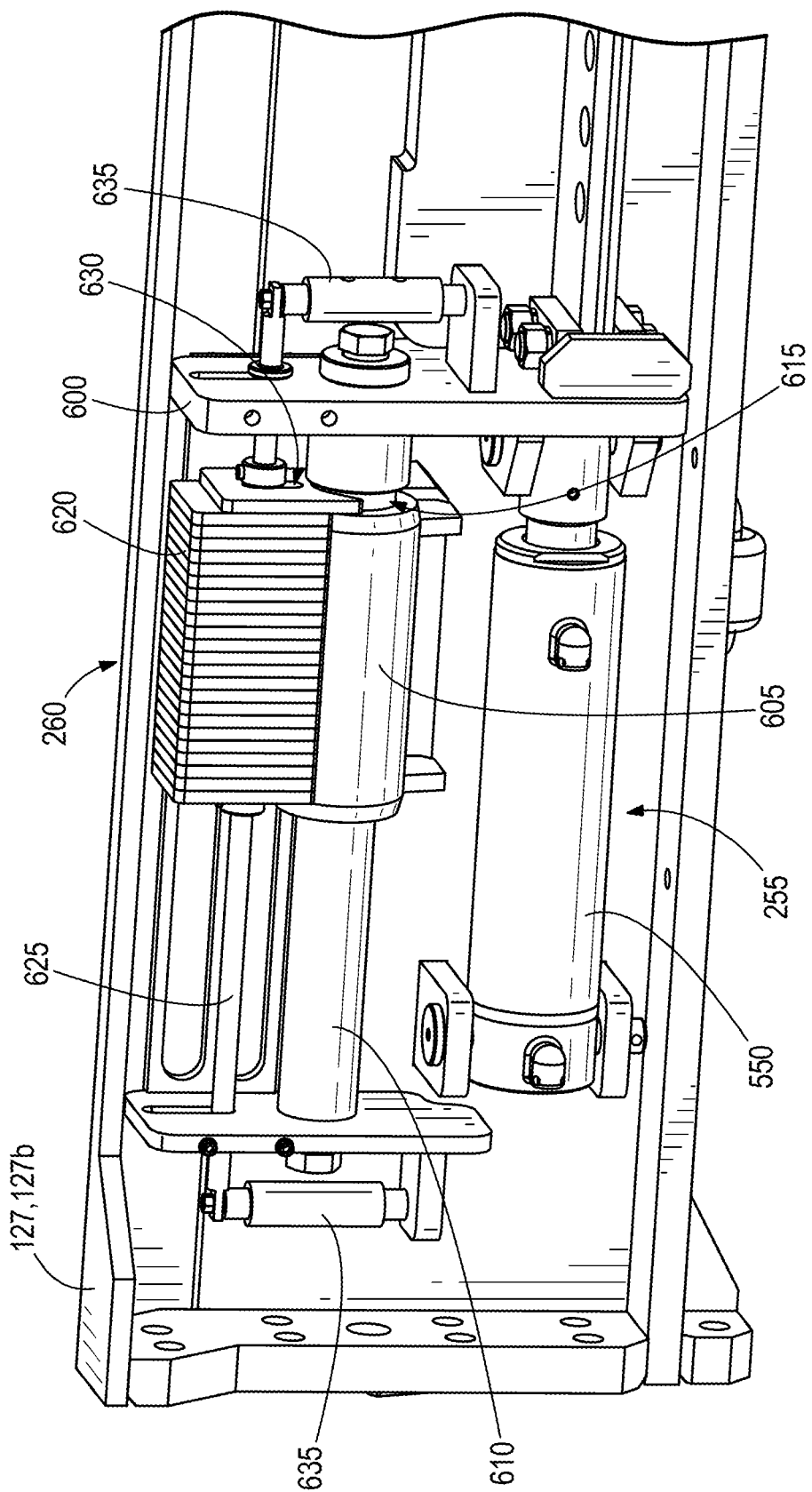
FIG. 8A illustrates a detailed perspective view of the subsystems of FIG. 7 in a first intermediate position.
Figure 9:
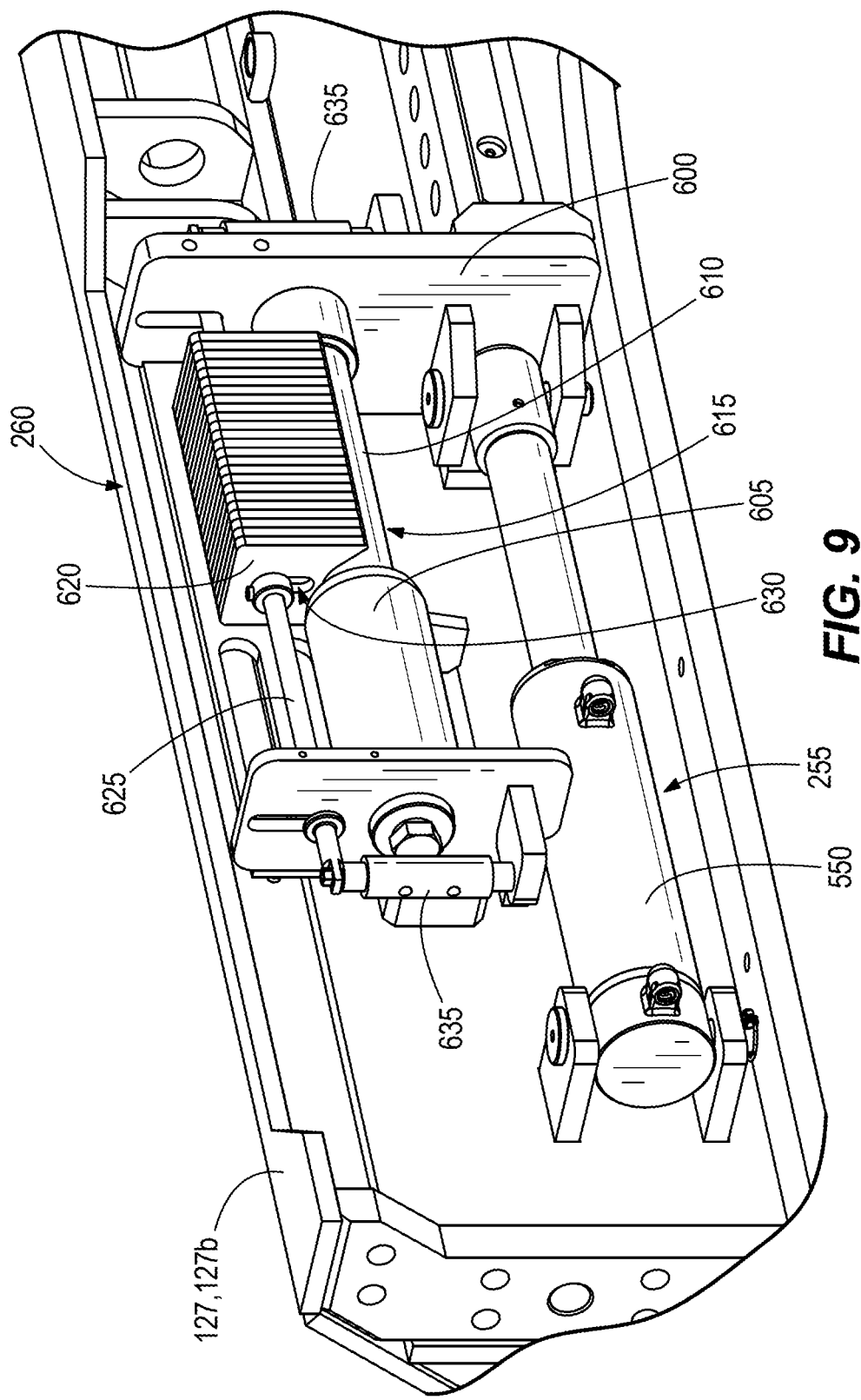
FIG. 9 illustrates a detailed perspective view of the subsystems of FIG. 7 in the completely extended position.

The mechanical subsystem 260 also includes a plurality of spacers 620 (e.g., shims). Each spacer 620 is movable into the receiving area 615. In some embodiments, each spacer 620 rests on the obstruction 605 until the spacer 620 moves relative to the obstruction 605 (or vice versa) to the point the obstruction 605 is out of the path of the respective spacer 620 (such as when the base 600 and the obstruction 605 change from the first configuration to the second configuration). As shown in FIGS. 8A-8C, the spacers 620 have moved into the receiving area 615 when the obstruction 605 no longer blocks the path of each respective spacer 620. This motion of each respective spacer 620 preferably occurs by only the influence of gravity. Stated another way, at least one spacer 620 of the plurality of spacers is movable from a resting position to an engagement position. The resting position may include the spacer 620 resting on the obstruction 605, and the engagement position may include the spacer disposed between the base 600 and the obstruction 605 (i.e., in the receiving area 615). In some embodiments, each respective spacer 620 may contact the post 610 when the spacer is in the engagement position.

Shown particularly in FIG. 6, the path each spacer 620 takes from the resting position to the engagement position may include following a line L2. In embodiments with the spacers 620 configured to move with the base 600 relative to the obstruction 605, the line L2 each respective spacer follows may effectively be a curved line relative to the obstruction. Relative to the base 600, the line L2 each respective spacer follows may be a straight line. In such embodiments, the line L2 may be parallel to a second axis A2. The second axis A2 may be orthogonal to the first axis A1.

The mechanical subsystem 260 may further include a rail 625. The rail 625 may be spaced apart from the obstruction 605. In embodiments including a rail 625, the plurality of spacers 620 are disposed on the rail and movable relative to the rail. Particularly, each spacer 620 may include a translation slot 630 defined therein. To move relative to the rail 625, each spacer 620 translates along the length of the respective translation slot 630. Stated another way, the rail 625 translates through the length of the respective translation slot 630 relative to the respective spacer 620.

The rail 625 is connected to the base 600 in many embodiments such that the rail translates with the base 600 relative to the obstruction 605. An actuator 635 may be connected to the rail 625. The actuator 635 may also be connected to at least one of the base 600 and the frame 127 (e.g., the first fame section 127a). In some embodiments, two actuators 635 may be connected to the rail 625 (e.g., one actuator at each end of the rail). The actuator 635 may be of any appropriate type capable of moving the rail 625 relative to the obstruction 605. In a particular embodiment, the actuator 635 includes a hydraulic actuator. In such an embodiment, the hydraulic actuator 635 may optionally utilize hydraulic fluid from the same source as the first hydraulic cylinder 550 and the second hydraulic cylinder. In other embodiments, actuators of varying types may be used. For example, each actuator 635 may alternatively include one or more solenoids, levers to be actuated by a user, springs, and the like.

The actuator 635, in an unactuated state, allows the spacers 620 to travel into the receiving area 615. When the actuator 635 is in the unactuated state and the respective spacer 620 is resting on the obstruction 605, the rail 625 occupies the translation slot 630 of the spacer with additional length of the translation slot 630 unoccupied on the side of the rail 625 opposite the obstruction (e.g., above the rail 625). When the actuator 635 is in the unactuated state and the respective spacer 620 has moved such that the obstruction 605 no longer blocks the path of the spacer 620, the rail 625 occupies the translation slot 630 of the spacer with additional length of the translation slot 630 unoccupied on the side of the rail 625 nearer the receiving area 615 (e.g., below the rail 625).

Figure 10:
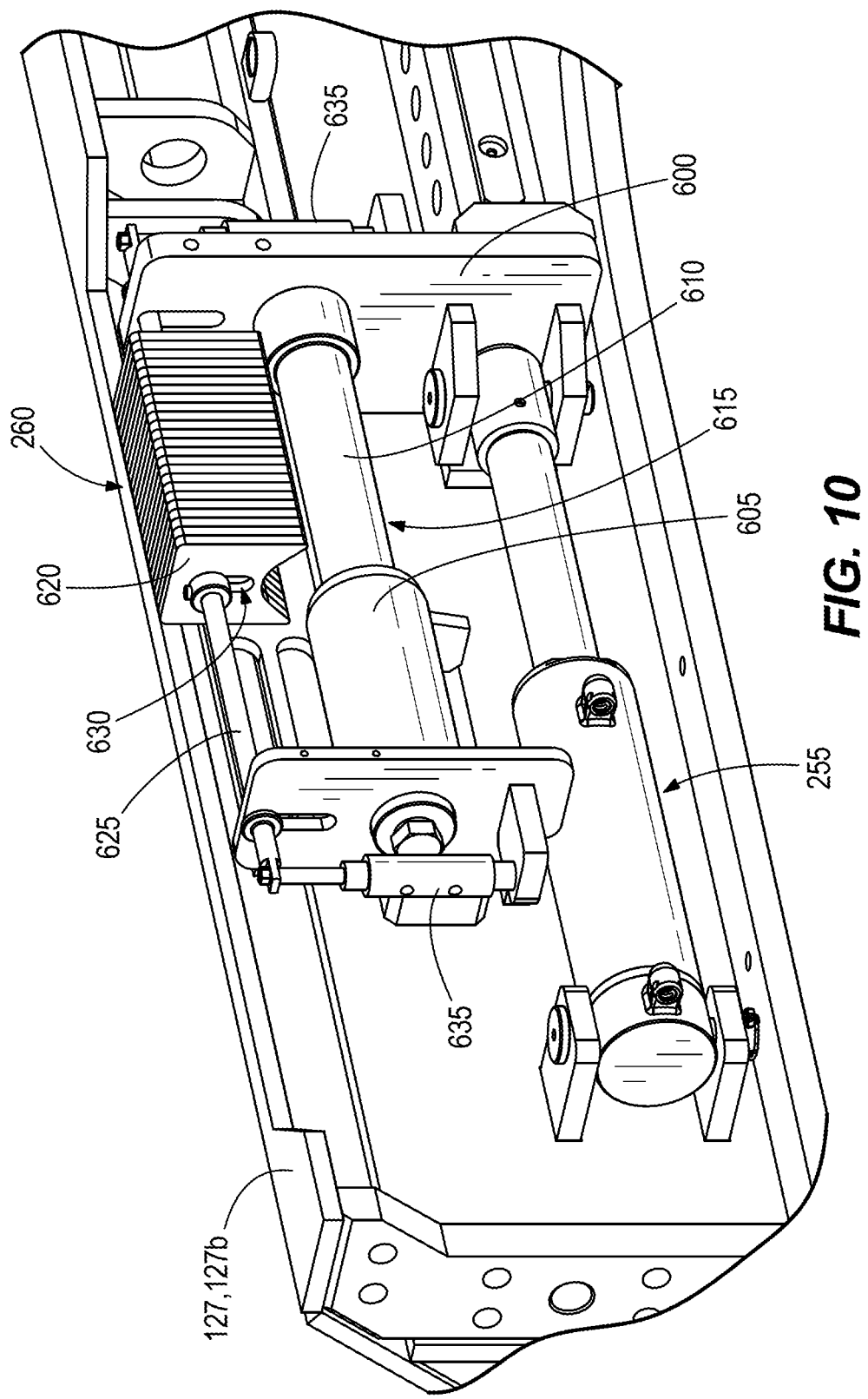
FIG. 10 illustrates a detailed perspective view of the subsystems of FIG. 7 in the completely extended position with the spacers, or shims, in a release position.

With reference to FIG. 10, upon actuation of the one or more actuators 635, the rail 625 moves along the translation slot 630 of each respective spacer 620. With regard to spacers 620 resting on the obstruction 605, the rail 625 simply travels along the translation slot 630 of each respective spacer without moving the spacer. With regard to spacers 620 occupying the receiving area 615, the rail 625 travels along the translation slot 630 of each respective spacer until it occupies the end of the translation slot 630 farthest from the receiving area 615. Upon contacting the respective spacer 620 at the end of the translation slot 630, the rail 625 translates the respective spacer 620 as the rail 625 continues to travel to the actuated position. This actuation thereby removes any spacers 620 that were previously occupying the receiving area 615 (shown in FIG. 10).

Some alternative embodiments may include the rail 625 occupying the translation slot 630 of a respective spacer 620 such that the rail 625 occupies the end of the translation slot farthest from the receiving area 615 when the spacer occupies the receiving area. In this configuration, translation of the rail 625 to the actuated position via the actuator 635 does not require travel along the translation slot 630 prior to lifting the respective spacers 620 that occupy the receiving area 615.

The spacers 620 may also vary in material and dimensions. In some embodiments, the spacers 620 include shims, plates, tabs, and the like. In other embodiments, the spacers 620 may alternatively include thicker blocks, stops, pads, and the like. In still further embodiments, the spacers 620 may all include uniform thicknesses. Yet, in other embodiments, the spacers 620 may vary in thickness from spacer to spacer along the line L1. Even further embodiments may include spacers 620 that may be removably and selectively connected to each other such that a user may select the desired effective thickness intervals for dropping the spacers into the receiving area 615.

In some embodiments, the spacers 620 may move into and out of the receiving area 615 in a variety of ways. For example, the spacers 620 may be rotatable, with the rail 625 defining the axis of rotation. The spacers 620 could rotate with the rail 625 but still have the ability to rotate relative to the rail if a resisting force is above a predetermined threshold. In such an embodiment, the spacers 620 could rotate into the receiving area 615 with rotation of the rail 625 as long as nothing blocks the pathway to the receiving area. If the obstruction 605 blocks the pathway of a respective spacer 620, the rail 625 could continue to rotate while the obstruction prevents the blocked respective spacer from rotating further with the rail 625. Spacers 620 not blocked by the obstruction 605 would be free to rotate with the rail 625 into the receiving area 615 until some portion of the frame 127, the post 610, or some other structure would block the particular spacer(s) 620 from further rotation. The rail 625 could rotate in the opposite rotational direction in order to remove the spacers 620 from the receiving area 615. In such an embodiment, the rail 625 may be connected to a drive shaft of a motor (e.g., a DC motor).

In another embodiment, the spacers 620 may freely rotate relative to the rail 625 in one rotational direction, but not be allowed to rotate relative to the rail in the opposite rotational direction. In such an embodiment, the spacers 620 could again freely fall into the receiving area 615 due only to the influence of gravity, but the spacers occupying the receiving area 615 could be removed from the receiving area by actuation of a motor rotating the rail 625 in the rotational direction that would also thereby rotate the spacers 620 with the rail 625.

Figure 11:
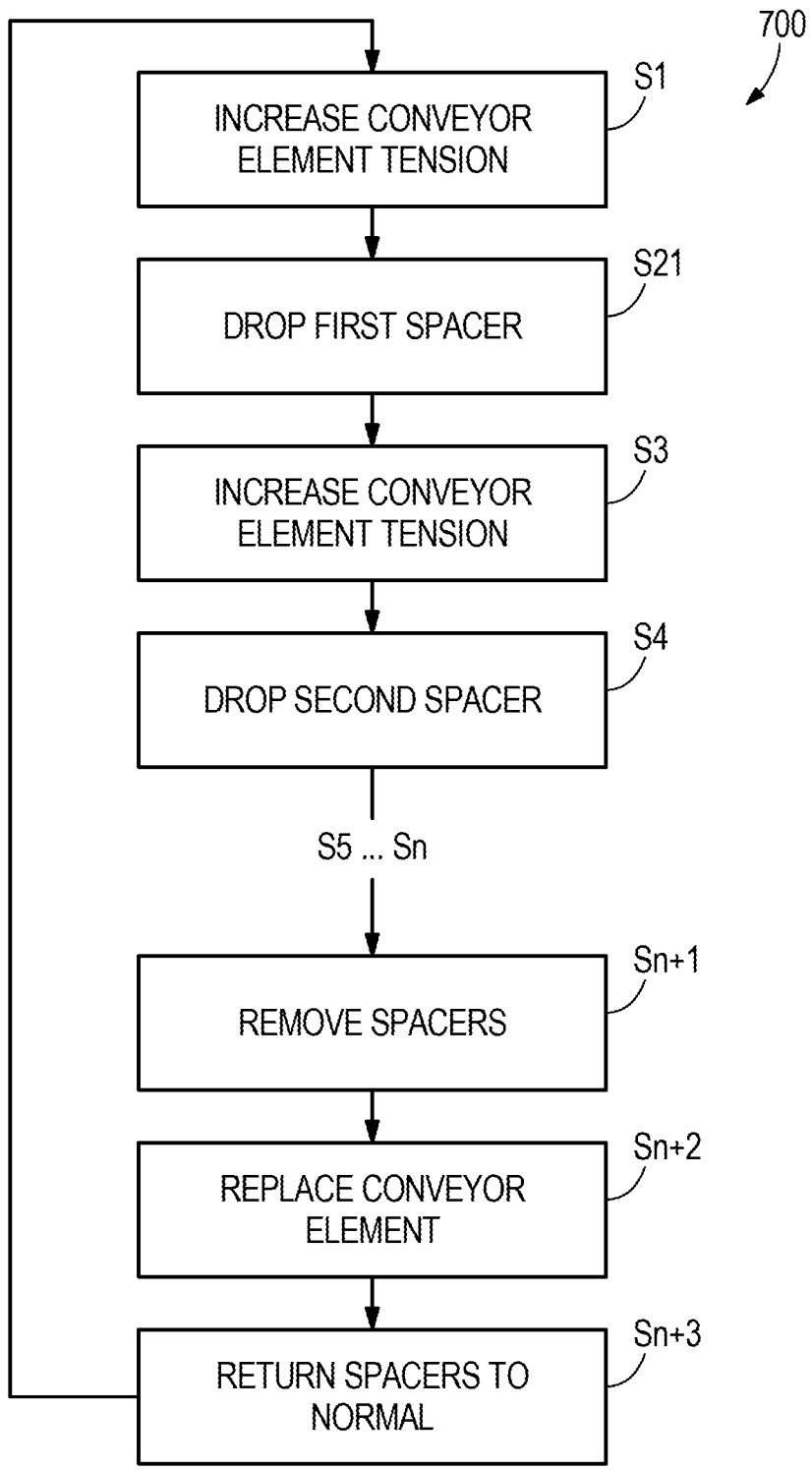
FIG. 11 is a flowchart illustrating a method of operating the conveyor tensioning system of FIG. 4.

Referring to FIG. 11, the present disclosure also relates to a method 700 of tensioning a conveyor element (e.g., first and second chains 120, 125 of a conveyor 105). The method may include a first step S1 of increasing the tension in the conveyor element (e.g., chains 120, 125). This step S1 may be accomplished as described above by increasing the distance between the first and second frame sections 127a, 127b (e.g., by extending the hydraulic cylinder 550). Additionally or alternatively, the step S1 may be accomplished by increasing the distance between the head shaft 110 and the tail shaft 115. During or shortly after the first step S1, the method may include a second step S2 of dropping a first spacer 620 into the spacer receiving area 615 (shown in FIG. 8A). After the second step S2, the method may include a third step S3 of further increasing the tension in the conveyor element (e.g., chains 120, 125). During or shortly after the third step S3, the method may include a fourth step S4 of dropping a second spacer 620 into the spacer receiving area 615 (shown in FIG. 8B).

In some embodiments, the fourth step S4 further includes dropping the second spacer 620 into the spacer receiving area 615 adjacent to the first spacer 620. Stated another way, the method may include dropping spacers 620 into the receiving area 615 adjacent to one another or nearly adjacent to one another. The method 700 may further include a sequence of steps S5-Sn, dropping successive spacers 620 into the spacer receiving area 615 as the tension is increased in the conveyor element (e.g., chains 120, 125).

The conveyor tensioning system allows for some flexibility and tension variation in the conveyor element. In particular, in some embodiments, a distance between the head shaft 110 and the tail shaft 115 may increase by an amount defined by the thickness of each respective spacer 620 before that spacer 620 drops into the receiving area 615. In other words, the distance between the head shaft 110 and the tail shaft 115 may vary within a range defined by the thickness of each respective spacer 620 without the conveyor tensioning system locking in an increased tension. Such flexibility in the conveyor tensioning system is particularly advantageous when the conveyor system 100 is moved and encounters varied terrain, which commonly occurs during mining operations. The conveyor tensioning system is able to accommodate temporary variations in conveyor tension that may be caused by variations in terrain, without locking in a temporarily increased tension in the conveyor element. In some embodiments, each of the spacers 620 defines a thickness between about 10 millimeters and about 50 millimeters. In the illustrated embodiment, each of the spacers 620 defines a thickness of about 30 millimeters. It has been found that a spacer thickness of 30 millimeters provides a preferred amount of flexibility in some applications of the conveyor tensioning system.

Referring again to FIG. 11, the method 700 may further include a step Sn+1 after the completion of the previously discussed steps S1-Sn. The further step Sn+1 may include removing the spacers 620 from the spacer receiving area 615. This step may be accomplished in any of the above described fashions. The spacers 620 may each be removed one at a time or may all be removed simultaneously (e.g., by actuating the actuators 635 to lift the rail 625 to the actuated position). After the spacer removal step Sn+1, the method may further include a conveyor element replacement step Sn+2. In such a step Sn+2, a user may replace the conveyor elements (e.g., chains 120, 125) due to maintenance requirements to prevent unacceptable chain stretch, wear, and the like. The conveyor element replacement step Sn+2 may include returning the first hydraulic cylinder 550 and the second hydraulic cylinder (not shown) to the completely contracted position. After the conveyor elements have been replaced, the method may include a return to normal step Sn+3, wherein the rail 625 (in embodiments including a rail) returns to the unactuated position to allow spacers 620 to rest on the obstruction 605 once more. In this configuration, all the spacers 620 may rest on the obstruction 605, or at least fewer spacers will occupy the receiving area 615 than before replacement of the conveyor elements. Now, the method may be repeated as the tension in the new conveyor element is increased.

In some embodiments of the method described above, the spacer dropping steps (e.g., steps S2 and S4) may each occur automatically. For instance, the spacers 620 may drop by the influence of gravity without any user intervention. Further, the tension increasing steps (e.g., steps S1 and S3) may also occur automatically. For instance, at least one of the first hydraulic cylinder 550 and second hydraulic cylinder may extend in response to one or more sensors detecting characteristics indicative of too much slack, or droop, in the conveyor element (e.g., chains 120, 125) without any user intervention.

Although particular embodiments have been described above, the above disclosure is not to be interpreted as limiting to the disclosed embodiments. A person having ordinary skill in the art, with the knowledge of this disclosure, may contemplate various alternative embodiments or additional features to disclosed embodiments that should be considered within the scope of the current disclosure. Additionally, some elements of one embodiment may be combined with other elements of another embodiment to create a new additional embodiment.

Various features and advantages of the disclosure are set forth in the following claims.

What is claimed is:

1. A tensioning system for a conveyor element of a conveyor, the tensioning system comprising:
   an obstruction;
   a base movable relative to the obstruction between a first configuration and a second configuration, the base positioned farther from the obstruction in the second configuration;
   a shim receiving area defined between the obstruction and the base;
   a rail spaced apart from the obstruction; and
   a plurality of shims disposed on the rail, each shim of the plurality of shims movable relative to the rail and movable into the shim receiving area, wherein:
in the first configuration, the obstruction prevents a respective shim from entering the shim receiving area, and
in the second configuration, the obstruction no longer prevents the respective shim from entering the shim receiving area.

2. The tensioning system of claim 1, wherein the obstruction and the base are slidably connected.

3. The tensioning system of claim 1, further comprising a first frame section, wherein the obstruction is fixed to the first frame section, and wherein the base is translatable relative to the first frame section and the obstruction.

4. The tensioning system of claim 3, wherein the rail is connected to the base such that the rail translates with the base.

5. The tensioning system of claim 1, further comprising an actuator connected to the rail, the actuator configured to move the rail.

6. The tensioning system of claim 5, wherein actuation of the actuator removes any shims from the shim receiving area.

7. The tensioning system of claim 6, wherein the actuator includes a hydraulic cylinder.

8. The tensioning system of claim 1, wherein:
each shim of the plurality of shims includes a translation slot, and
each shim of the plurality of shims is configured to enter the shim receiving area by translating relative to the rail along a length of the shim's respective translation slot.

9. The tensioning system of claim 8, wherein each shim of the plurality of shims translates relative to the rail and into the shim receiving area by only the influence of gravity.

10. A tensioning system for a conveyor element of a conveyor, the tensioning system comprising:
an obstruction;
a base movable relative to the obstruction; and
a plurality of spacers, at least one spacer of the plurality of spacers movable from a resting position to an engagement position by only gravity, the at least one spacer resting on the obstruction in the resting position and disposed between the base and the obstruction in the engagement position.

11. The tensioning system of claim 10, wherein the base is movable relative to the obstruction along a first axis.

12. The tensioning system of claim 11, wherein the at least one spacer is movable from the resting position to the engagement position in a direction orthogonal to the first axis.

13. The tensioning system of claim 10, wherein the plurality of spacers is movable with the base relative to the obstruction.

14. The tensioning system of claim 10, further comprising a post connected to the base and movable relative to the obstruction, wherein the at least one spacer contacts the post in the engagement position.

15. The tensioning system of claim 10, further comprising a first frame supporting a first shaft; and
a second frame supporting a second shaft spaced from the first shaft, the conveyor element spanning between the first shaft and the second shaft,
wherein the base is fixed to the first frame,
wherein the obstruction is fixed to the second frame, and
wherein the at least one spacer is movable to the engagement position in response to movement of the first shaft away from the second shaft.

16. A method of tensioning a conveyor element of a conveyor, the method comprising:
a) increasing the tension in the conveyor element;
b) automatically dropping a first spacer into a spacer receiving area;
c) increasing the tension in the conveyor element further; and
d) automatically dropping a second spacer into the spacer receiving area.

17. The method of claim 16, wherein step d further includes dropping the second spacer into the spacer receiving area adjacent to the first spacer.

18. The method of claim 16, further comprising:
removing the first spacer and the second spacer from the spacer receiving area; and
replacing the conveyor element.

19. The method of claim 18, wherein the first spacer and the second spacer are removed from the spacer receiving area simultaneously.

* * * * *